(12) United States Patent
Knight (10) Patent No.: US 10,343,669 B1
(45) Date of Patent: Jul. 9, 2019

(54) APPARATUS FOR FACILITATING CHECKING OPERATION OF VEHICLE BRAKE LIGHTS AND AIR BRAKES

(71) Applicant: Monica Faye Knight, Houston, TX (US)

(72) Inventor: Monica Faye Knight, Houston, TX (US)

( * ) Notice: Subject to any disclaimer, the term of this patent is extended or adjusted under 35 U.S.C. 154(b) by 0 days.

(21) Appl. No.: 16/133,630

(22) Filed: Sep. 17, 2018

(51) Int. Cl.
  *B60T 17/22* (2006.01)
  *B60S 5/00* (2006.01)
  *B60Q 11/00* (2006.01)
  *B60T 7/00* (2006.01)

(52) U.S. Cl.
  CPC ............ *B60T 17/22* (2013.01); *B60Q 11/005* (2013.01); *B60T 7/00* (2013.01); *B60S 5/00* (2013.01); *B60T 17/221* (2013.01); *F16F 2236/045* (2013.01)

(58) Field of Classification Search
  CPC . B60T 7/04; B60T 7/045; B60T 7/047; B60T 17/045; B60T 17/047; B60T 17/22; B60T 17/221; B60T 17/223; F16F 2236/04; F16F 2236/045; G05G 5/06; G05G 5/12; G05G 5/14; G05G 5/18; G05G 5/20; G05G 5/24; B60S 5/00; B60Q 11/005; Y10T 74/20666; Y10S 254/05
  USPC .......... 188/265, 89; 303/89; 73/132; 74/532; 254/DIG. 5
  See application file for complete search history.

(56) References Cited

U.S. PATENT DOCUMENTS

| | | | | |
|---|---|---|---|---|
| 1,615,798 A | * | 1/1927 | Cowdrey | B60T 17/223 254/95 |
| 1,681,192 A | * | 8/1928 | McBride | B60T 11/04 124/37 |
| 1,760,602 A | * | 5/1930 | Allen | B60S 5/00 73/132 |
| 1,883,154 A | * | 10/1932 | Watrous | B66F 3/02 177/208 |
| 2,138,911 A | * | 12/1938 | Evans | G05G 5/06 254/101 |
| 2,171,832 A | * | 9/1939 | Hoeppner | G05G 5/06 254/DIG. 5 |
| 2,694,318 A | * | 11/1954 | Smith, Sr. | B60T 17/223 267/170 |
| 2,820,626 A | * | 1/1958 | Hedeen | B25B 27/00 248/354.5 |
| 3,125,898 A | * | 3/1964 | Maples | B60T 17/223 248/354.3 |
| 3,722,266 A | * | 3/1973 | Dunham | B60T 17/223 254/DIG. 5 |
| 3,836,174 A | * | 9/1974 | Holman, Jr. | B60P 7/15 211/105.6 |
| 5,201,488 A | * | 4/1993 | Hadbavny | B60R 25/005 188/352 |

(Continued)

FOREIGN PATENT DOCUMENTS

JP     60085048 A  *  5/1985  ............... B60T 7/04

*Primary Examiner* — Thomas J Williams
(74) *Attorney, Agent, or Firm* — Karen B. Tripp (57) ABSTRACT

A method and apparatus for activating a vehicle's brake pedal for testing proper operation of the vehicle's brake lights and/or for testing for an air leak in the vehicle's air brake system. The method and apparatus can be advantageously employed by a single operator of the vehicle without need for assistance from another person.

6 Claims, 5 Drawing Sheets

(56) References Cited

U.S. PATENT DOCUMENTS

| | | | | |
|---|---|---|---|---|
| 6,125,590 A | * | 10/2000 | Dionne | E05D 13/08 |
| | | | | 49/453 |
| 6,131,712 A | * | 10/2000 | Rhodenizer | B60T 17/223 |
| | | | | 188/3 H |
| 8,490,930 B2 | * | 7/2013 | Huang | B60P 7/15 |
| | | | | 248/122.1 |
| 9,475,472 B2 | * | 10/2016 | Sakashita | B60T 7/042 |

* cited by examiner

APPARATUS FOR FACILITATING CHECKING OPERATION OF VEHICLE BRAKE LIGHTS AND AIR BRAKES

CROSS REFERENCE TO RELATED APPLICATION

Not Applicable

STATEMENT REGARDING FEDERALLY SPONSORED RESEARCH OR DEVELOPMENT

This invention is not the result of federally sponsored research.

REFERENCE TO SEQUENCE LISTING, A TABLE, OR A COMPUTER PROGRAM LISTING, OR A COMPACT DISK APPENDIX

None

BACKGROUND

1. Field of the Invention

The present invention relates generally to methods and apparatuses for facilitating the checking of vehicle brake lights to verify the lights are working and also for facilitating the checking of vehicle air brakes to verify the air brakes are not leaking air. The invention relates particularly to such checking of brake lights and air brakes of trucks.

2. Description of Relevant Art

The trucking industry has been called the lifeblood of the United States economy. Almost 70 percent of freight tonnage is moved on trucks. Recently, it was reported that about 3 million heavy-duty trucks (class 8 trucks) are needed each year for the transportation of over 9 billion tons of freight.

Despite the immense importance of the trucking industry, the industry faces a number of challenges. The biggest concern is safety. Thousands of accidents are caused each year due to safety violations combined with fatigued drivers and time deadlines imposed on tired truck drivers. The United States Department of Transportation and the Federal Motor Carrier Safety Administration diligently implement rules and changes to prevent fatal and life altering injuries. Nevertheless, despite the rules and regulations in place, accidents still occur.

One safety challenge is maintenance of trucks, tractors, trailers, tires and brakes. Truck drivers are required by law to inspect numerous parts of their vehicles for proper operation before driving and after driving for a certain number of miles each day. Most truck drivers comprehend the dangers they confront on the road and take safeguards to drive safely and competently. However, the inspections can be time consuming and difficult to do at times.

For example, if brake lights are not properly working, a motorist can not see a large rig slowing down or stopped. For another example, if air brakes are leaking air, the brakes can fail. Inspections to avoid such failures and consequent safety hazards call for one person to stand behind the truck to look at the brake lights, or to stand beside the truck near the air brakes to listen for air leaks, when the brakes are engaged, but another person is needed to sit inside the truck and operate the brakes. However, many truck drivers drive alone and do not always have access to a second person to assist them with such inspections.

There is a need for ways to help truck drivers conduct safety inspections of their vehicles more efficiently and accurately.

SUMMARY OF THE INVENTION

The present invention provides an apparatus and a method employing a compressible and expandable vehicle brake pedal actuator for use with a vehicle having a break pedal in an opposing position to a vehicle seat brace or frame. The vehicle brake pedal actuator of the invention comprises an internal tube or arm inserted in an external tube or arm. The internal tube or arm is formed with a series of recesses or holes for use in connecting to or engaging with the external tube or arm. The vehicle brake pedal actuator further comprises a means for compressing and expanding, preferably controllably. The inner tube or arm and the external tube or arm can be held stationary and fixed together with a detent pin extending through both. A spring in association with the actuator imparts pressure and friction on portions of the actuator to cause the actuator to extend between the brake pedal and the opposing seat frame or brace with sufficient force as to maintain such position and cause sufficient pressure on the brake pedal to activate the brake and hold that activation. Preferably the opposing ends of the activator each have a pivoting foot member, which preferably is graded or serrated, to enhance the stability of the activator in maintaining its position between the brake pedal and the seat frame or brace.

BRIEF DESCRIPTION OF THE DRAWINGS

Embodiments of the invention will now be described in detail, by way of example, and with reference to the accompanying drawings, wherein.

DETAILED DESCRIPTION OF THE INVENTION

The present invention provides an apparatus and method that enables vehicle operators to check their brake lights and to check for air leaks in their air brake systems without help from other persons. The present invention meets the need of allowing a truck driver to conduct safety checks of his truck that require depression of the truck's brake pedal without the truck driver having to remain in the truck to depress that brake pedal. With the present invention, the truck driver can be behind his truck looking at the brake lights or adjacent the truck near the air brake system listening for air leaks, while the apparatus of the invention is causing the brake pedal to depress and the brake to operate.

Other uses of the present invention include any endeavor where activation of a vehicle's brakes, without a person having to be personally activating the brake pedal, is helpful, useful, or necessary. Examples of such uses will be discussed further below.

Generally, in one embodiment, the present invention can be said to provide an improved method of single-operator vehicle brake light engagement and subsequent observance of rearward facing illuminated lights. This is achieved through an extendable, adjustable brake brace or brake pedal activator of the invention that is placed between the brake pedal and the seat or automotive seat mounting bracket (or automobile frame) in order to actuate and depress the brake pedal and hold the brake pedal in an engaged position for an extended period of time to allow for brake light inspection and/or adjustment.

The brace or brake pedal activator is comprised of two arms, one outer arm having a diameter just larger than the inner arm, where the outer arm is stationary and exhibiting a pivoting grated "foot" brace at one end and an open end that is made to reversibly accept the movable inner arm, having a grated "foot" brace for placement against an automotive brake pedal or a seat or seat brace at its opposing end. Within the outer arm is an internal spring mechanism that is encapsulated by the outer arm and is made to communicate and accept the inner, mobile arm. The inner arm engages the spring mechanism, which in one embodiment is positioned at a point most distal to the outer arm's "foot" brace and within the outer arm, the spring being the compressible, functioning member. In an alternative embodiment, the spring mechanism is positioned so as to cause friction or pressure on the inner and/or outer arms at least at the point of connection, and resulting in friction in use at the "foot" braces, so the apparatus will maintain position to depress the vehicle pedal.

The outer arm and inner arms each have a grated or serrated "foot" brace pivotally attached and made to run perpendicular to the arms of the apparatus positioned and telescopically engaged along a horizontal axis.

In operation, in one embodiment, the internalized spring is suspended in a semi-contracted state where the spring is designed to be compressed and made to allow the inner arm to move within the outer arm upon compression. The apparatus achieves a compressed state with application of force at both ends and full extension at rest (i.e. with the release of force). When the present invention is used to actuate the brake pedal, the inner arm is advanced within the outer arm inward, the spring is compressed and the overall length of the apparatus is shortened to facilitate insertion of the apparatus between the brake pedal and seat, seat bracket or frame. The apparatus is then allowed to expand, with the removal of force, to the distance between the actuated brake pedal and the seat, seat bracket or frame, thus holding the apparatus taut and in a position that exerts force outward maintaining an engaged conformation and, ultimately, brake pedal depression and brake engagement and brake light illumination.

In one embodiment, the adjustable brace or brake pedal activator of the present invention is used by a single operator of a vehicle to check the functioning of the vehicle's and or the vehicle's trailer's brake lights, and to observe and initiate adjustments where needed.

In another embodiment, the adjustable brake brace of the present invention can be used by a single operator of a large, heavy vehicle (e.g. trucks, semi-trucks, buses, tractor-trailers and the like) which uses a compressed air breaking system. The brace or brake pedal activator of the present invention can be used to activate the air brake system and can allow the single operator of the vehicle an opportunity to inspect the air brake system for possible leaks without having to be the person activating the air brake for the testing.

In another embodiment, the brace or brake pedal activator of the present invention allows for the inspection and adjustment of brake lights and brakes for proper functioning, by a single individual operator. The brake pedal activator activates the brakes by pressing on the brake pedal, allowing the individual to inspect the engaged brake light system and to make necessary adjustments and/or repairs.

In yet another embodiment, the brace or brake pedal activator of the present invention allows a single operator of a vehicle the opportunity to inspect the proper functioning of both a tractor and a trailer or trailers as warranted by prudent (and DOT regulated) pre-trip and post-trip inspections or in a case where improper functioning of brake lights is suspected.

In another embodiment, the brace or brake pedal activator of the present invention can be used by tow truck operators to securely maintain the vehicle's brake system in a "locked" or "stationary" position during transport. The apparatus is especially useful to a tow truck operator of a flatbed tow truck where the maintenance of a stationary vehicle is essential during transport.

In another embodiment, the brace or brake pedal activator of the present invention allows a single operator of a vehicle to engage the brake light system as an additional point of illumination where, for whatever reason, the vehicle is parked along the side of the road as a result of mechanical engine malfunction or a deflated tire. The brace or brake pedal activator here serves to cause additional illumination at the rear of the vehicle, supplementing any hazard/warning lights, so as to augment and improve vehicle recognition from oncoming traffic. This feature is particularly desirable in conditions of poor or shortened distance visibility to further serve as a supplemental safety feature.

In yet another embodiment, the mechanism for telescoping and retracting the inner arm within the outer arm can consist of a ratcheting wrench, a detent pin, a depressible pin or similar system that allows for both compression, expansion and static placement of the brace between an automotive or other vehicle brake pedal and an automotive or other vehicle seat or seat frame.

Figure 1:
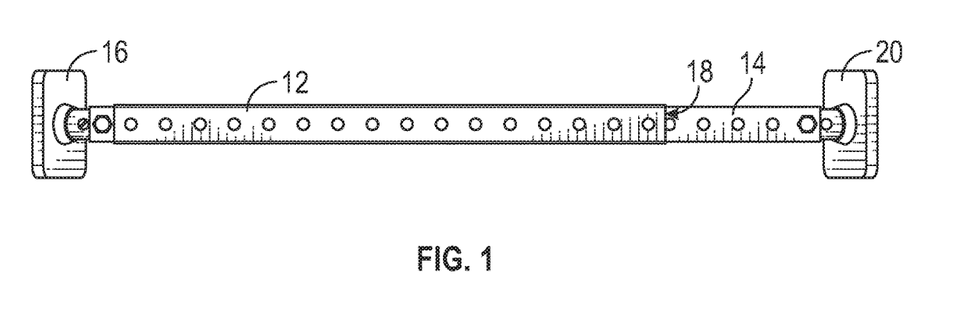
FIG. 1 is a top view of one embodiment of the apparatus of the present invention.
Figure 2:
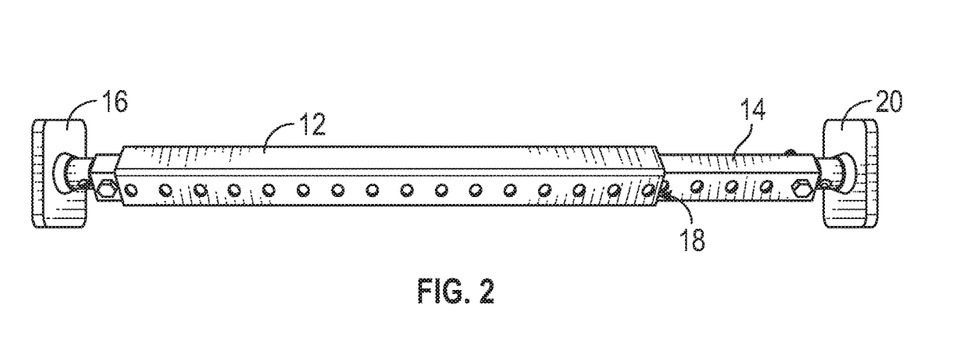
FIG. 2 shows the apparatus of FIG. 1 turned 45 degrees its centrally running axis.
Figure 3:
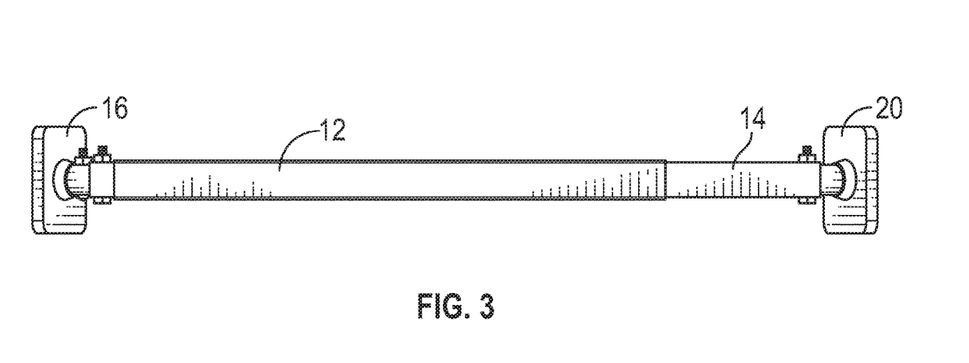
FIG. 3 shows the apparatus of FIG. 1 rotated 90 degrees.

Referring to the Figures to further describe the invention, FIG. 1 provides an exemplary illustration of a top view of a brake pedal activator 10. FIG. 2 provides an exemplary view of brake pedal activator apparatus 10 where the outer tube or arm 12 and inner tube or arm 14 of the apparatus 10 have been rotated 45 degrees from the view shown in FIG. 1. FIG. 3 depicts a rotation of an additional 45 degrees from FIG. 2 and a total of 90 degrees of rotation from FIG. 1. The brake pedal activator apparatus 10 is comprised of two tubes or arms, one outer or external tube or arm 12 having a diameter just larger than the inner or internal tube or arm 14, where the tube or arm 12 is stationary having a pivoting grated "foot" member or brace 16 at one end and an opposing open end orifice 18 that is made to reversibly accept the moveable arm 14.

Figure 4:
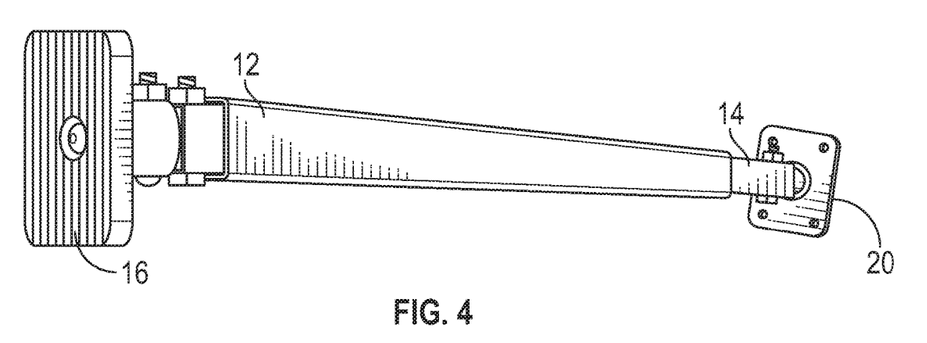
FIG. 4 is a perspective view of the apparatus of FIG. 1 showing the grated or serrated "foot" member that is pivotably attached to the outer arm of the apparatus.
Figure 5:
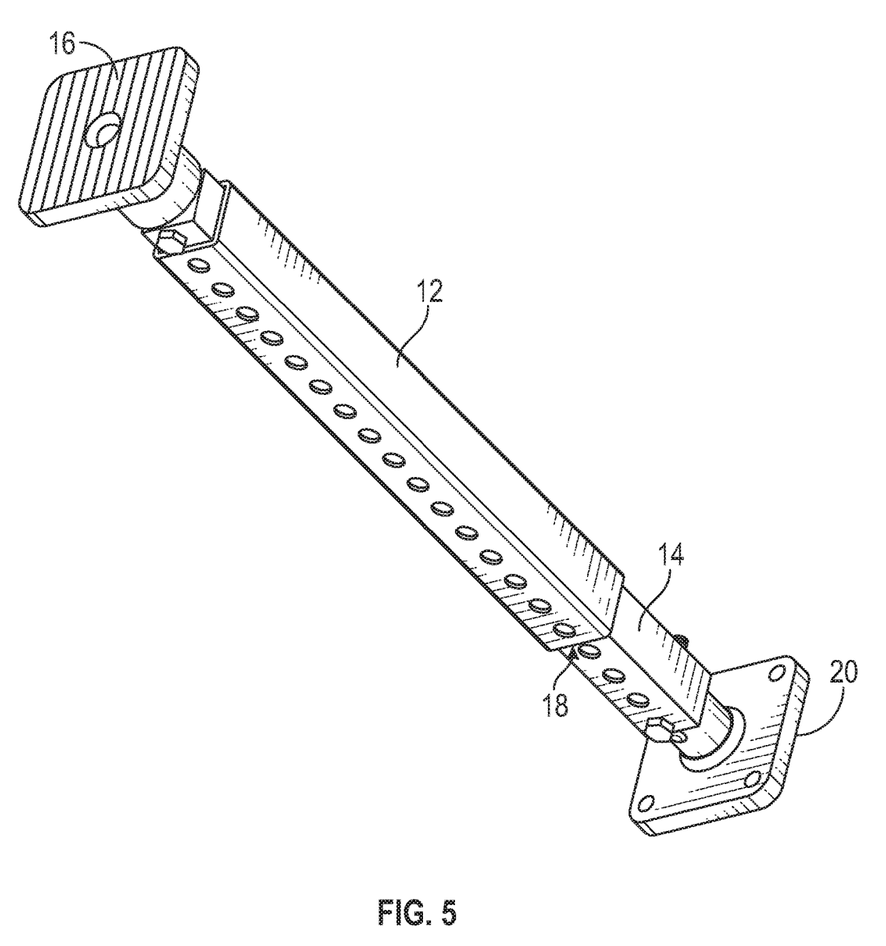
FIG. 5 provides another perspective view of the apparatus of FIG. 1.

The present invention can further be seen in perspective views of FIGS. 4 and 5 in a compressed state (i.e. where inner arm 14 has traversed a predetermined length of outer arm 12, internally, to the point where the "foot" member 20 of the inner arm 14 is made to communicate (or come into close approximation) with the receiving orifice 18 of the outer arm proximally.

In one embodiment, within the outer arm 12 is an internal spring mechanism (not shown) that is encapsulated by the outer arm 12 and is made to communicate and accept the inner, mobile arm 14. The inner arm 14 engages the spring mechanism (not shown) at an end most proximal to the outer arm orifice 18 and within the outer arm 12. The end most distal to the inner arm 12 is capped by a second pivoting serrated or grated "foot" brace 20 attached to and made to run perpendicular to horizontally configured arms 12 and 14.

In an alternative embodiment, the internal spring mechanism is positioned at a point of engagement or connection between inner arm 14 and outer arm 12 so as to put pressure on the arms and on the pivoting feet to facilitate the apparatus 10's pressing and maintaining the pressing of the vehicle brake pedal. That is, the spring mechanism causes or results in friction between the apparatus and the brake pedal and between the apparatus and the vehicle seat frame or brace.

Figure 6:
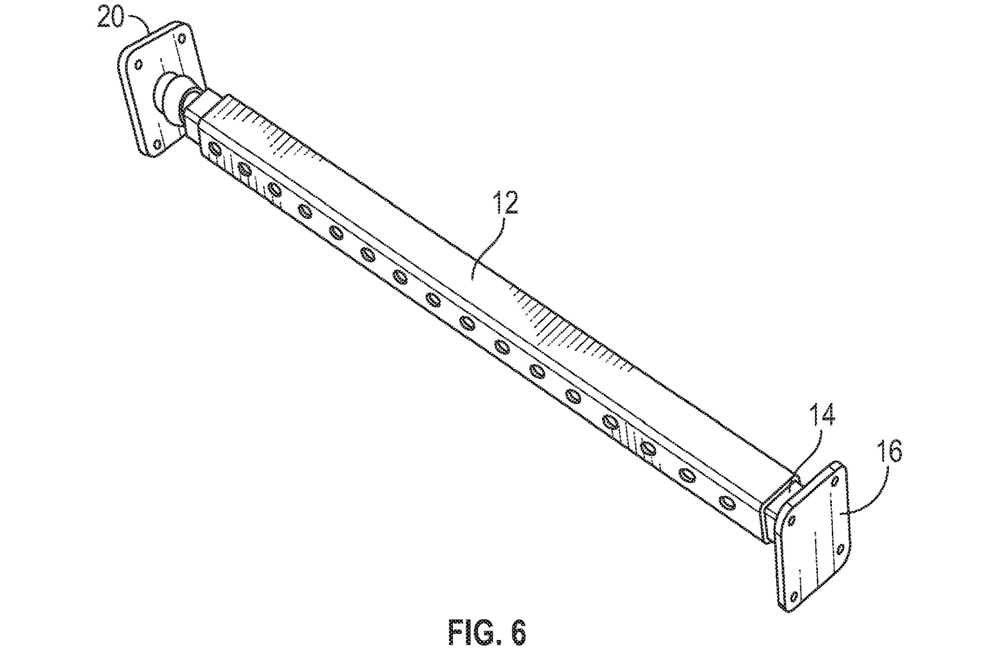
FIG. 6 illustrates a perspective view of the apparatus of FIG. 1 in a compressed configuration.

FIG. 6 exemplifies one embodiment of a compressed version of the apparatus of the present invention where inner arm 14 is advanced into outer arm 12 ahead of insertion between a vehicle's brake pedal 22 and the seat 24 or vehicle seat frame 26 (see apparatus deployment in FIG. 8) where the "foot" member 16 of the inner arm 14 further depicts a version of the apparatus with limited serration.

Figure 8:
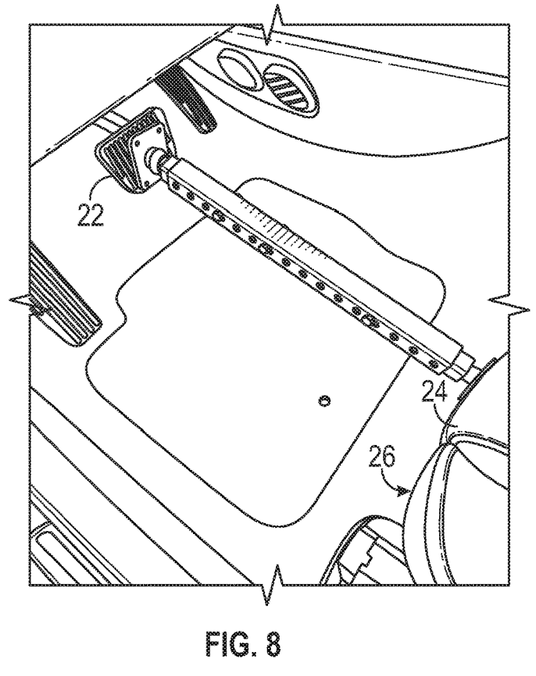
FIG. 8 shows the apparatus of FIG. 1 compressed and made to engage both a vehicle brake pedal and the seat frame in a vehicle.

In operation of one embodiment of the invention, as illustrated in FIG. 8, the internalized spring (not shown) is suspended in a semi-contracted state where the spring is compressed and made to allow the inner arm 14 to move within the outer arm 12 upon compression and where the apparatus 10 achieves a state of full extension at rest. When the present invention is used to actuate the brake pedal 22, the inner arm 14 is advanced within the outer arm 12 inward, the spring is compressed and the overall length of the apparatus is shortened to facilitate the insertion of the apparatus between the brake pedal 22 and seat 24 or automobile seat frame 26. The apparatus 10 is then allowed to expand to the distance between the actuated brake pedal 22 and the seat 24, or automobile seat frame 26, thus holding the apparatus taut and in a position that exerts force outward and thus maintains an engaged conformation.

In operation in an alternative embodiment, the apparatus of the invention is held in place to depress the brake pedal with a ratcheting mechanism, much like that used in a car jack for lifting a car to change a tire. A ratcheting mechanism for a support apparatus such as taught in U.S. Pat. No. 8,490,930, incorporated herein in its entirety by reference, provides another mechanism that can be used in the apparatus of the invention to hold it in place to depress the brake pedal.

Figure 9:
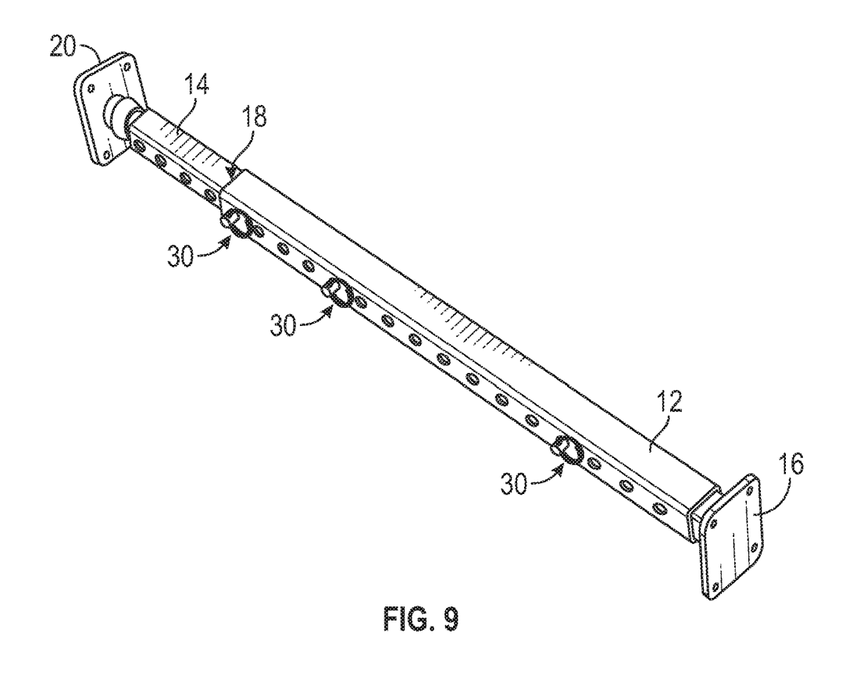
FIG. 9 shows the apparatus of FIG. 1 using detent pins for securing the inner and external arms at a certain length for use.

FIG. 9 illustrates a preferred embodiment where detent pins 30 are used to maintain the apparatus of the invention in a compressed or retracting state thereby allowing the user to "lock" the invention at a desired length between two points of contact (e.g. the brake pedal 22 at one end and the seat 24 or vehicle seat frame 26 at the other).

Figure 10:
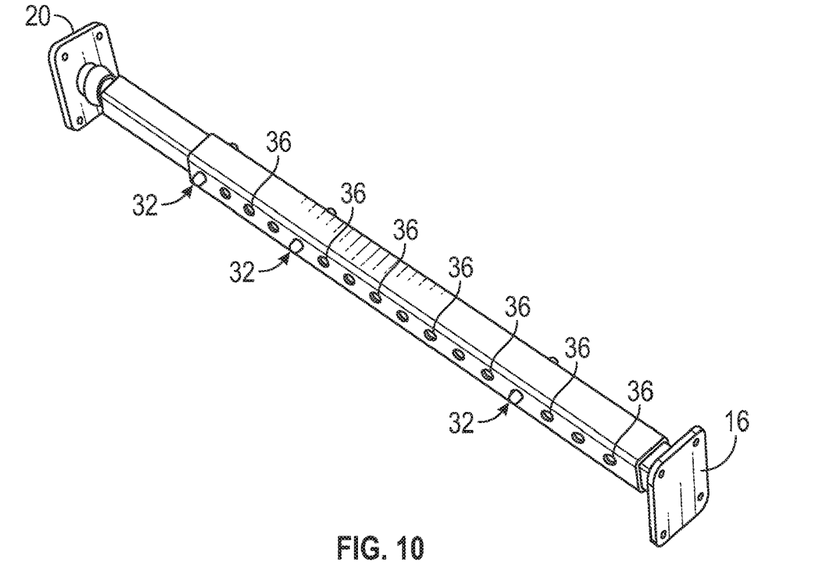
FIG. 10 shows the apparatus of FIG. 1 wherein depressible pins engage apertures for securing the inner and external arms at a certain length for use.

FIG. 10 shows a series of depressible pins 32 that are made to engage apertures 36 at a predetermined length for securing the invention in compressed or engaged configuration and for apparatus 10 operation.

Figure 7:
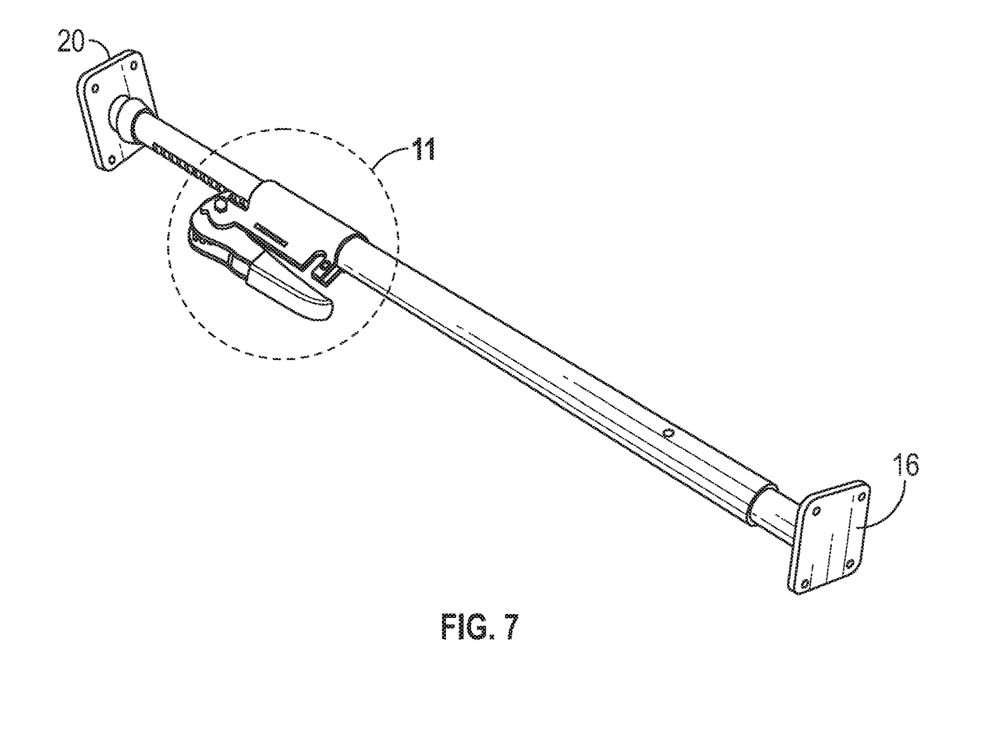
FIG. 7 provides an alternative embodiment of the apparatus of the invention having a ratcheting member as a means for extending and retracting the inner arm member.
Figure 11:
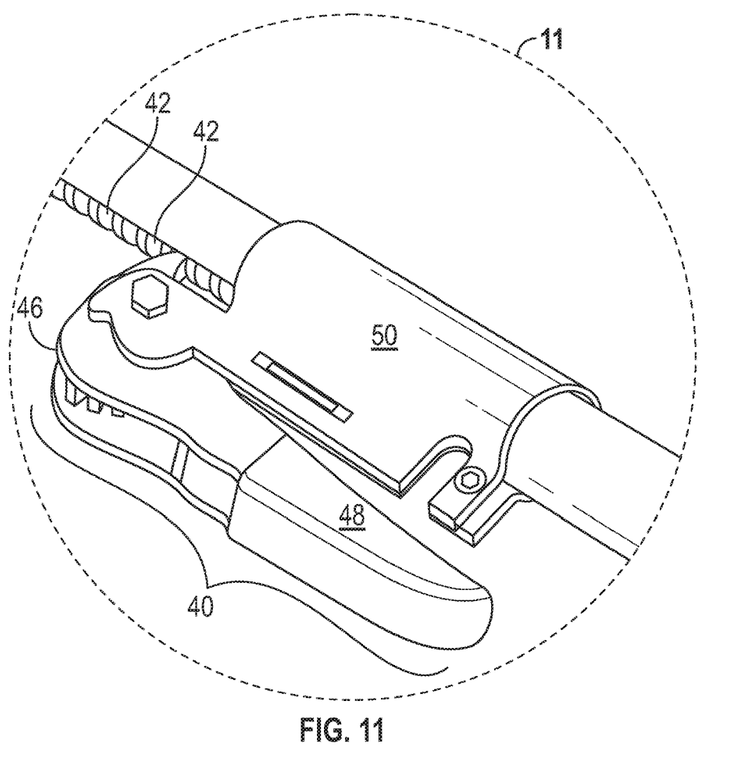
FIG. 11 is an expanded view of the operable mechanism of the apparatus of FIG. 7.

FIGS. 7 and 11 depict an alternative embodiment of the apparatus of the invention using a bi-directional ratcheting wrench 11 for the advancement and retraction of the arms 12 and 14 of the apparatus 10 where a bi-directional ratcheting wrench 11 is secured to the outer and terminal portion of the outer arm 12 via a stationary securing clamp 50 and is operated where a toothed wheel 46 is made to come into communication with grooves 42 on exterior of the inner arm 14. Movement of the handle 48 allows the toothed wheel 46 to advance and meet the grooves 42 of the inner arm 14 thereby causing the apparatus 10 to increase in length. The inner arm 14 can be retracted into the outer arm 12 with release of the bi-directional ratcheting wrench 11 or by reverse operation of the handle 40 of the bi-directional ratcheting wrench 11.

Although specific embodiments of this invention have been shown and described herein, it is understood that these embodiments are merely illustrative of the many possible specific arrangements that can be devised in application of the principles of the invention. Numerous and varied other arrangements can be devised in accordance with these principles by those of ordinary skill in the art. Thus, the scope of the present invention should not be limited to the structures described in this application, but only by the structures described by the language of the claims and the equivalents of those structures.

What is claimed is:

1. A compressible and expandable vehicle brake pedal actuator for use with a vehicle having a brake pedal in an opposing position to a vehicle seat support or frame, comprising:

an external tube having a first end and a second end;

an internal tube of lesser diameter than said external tube and having a proximal end and a distal end, the proximal end being insertable into the first end of said external tube and slidable within said external tube;

a first pivoting serrated or grated foot member, attached to the distal end of the internal tube;

a brace at the second end of the external tube, said brace having attached a second pivoting serrated or grated foot member;

a first fixing element for releasably holding the brace and the external tube together;

an internalized, compressible spring disposed within a portion of the external tube and which engages a portion of the internal tube and provides friction at the point of engagement between the internal tube and the external tube when the spring is compressed;

a second fixing element for releasably holding the external tube and the internal tube together;

wherein the positioning of said first fixing element along the external tube and the brace and the positioning of the second fixing element along the external tube and the internal tube determines the length of the actuator and the amount of compression of the spring and consequent outward force exerted by the actuator against the brake pedal when in operation, and wherein in operation, the first pivoting member is positioned to press against the vehicle brake pedal to activate the brake pedal and the second pivoting foot member is positioned to press against the vehicle seat frame to hold the brake pedal actuator in place to maintain activation of the brake pedal, or the second pivoting foot member is positioned to press against the brake pedal to activate the brake pedal and the first pivoting foot member is positioned to press against the vehicle seat frame to hold the brake pedal actuator in place to maintain activation of the brake pedal, and the spring is compressed and held against the internal tube with sufficient friction for the brake pedal actuator to maintain the activation of the brake pedal.

2. The vehicle brake pedal actuator of claim 1 wherein said second fixing element is a detent pin or a depressible pin.

3. The vehicle brake pedal actuator of claim 2 further comprising at least one hole in or through the internal tube and at least one hole in or through the external tube corresponding to said at least one hole in or through the internal tube such that insertion of said detent pin or depressible pin through said hole in the outer tube and said corresponding hole in the inner tube holds the inner tube and the outer tube together.

4. The vehicle brake pedal actuator of claim 2 wherein the external tube, the internal tube, and the brace comprises multiple holes for receiving first and second fixing elements.

5. The vehicle brake pedal actuator of claim 1 wherein said first fixing element is a detent pin or a depressible pin.

6. A method for testing vehicle brake lights or air brakes in vehicles having a brake pedal in an opposing position to a vehicle seat support or frame, comprising:
   installing the apparatus of claim 1 between the vehicle brake pedal and the vehicle seat support or frame; and
   while said apparatus is installed, observing the vehicle brake lights or listening to the air brakes for proper operation.

* * * * *